United States Patent
Hickling (10) Patent No.: US 8,913,698 B2
(45) Date of Patent: Dec. 16, 2014

(54) PROGRAMMABLE, FREQUENCY AGILE DIRECT CONVERSION DIGITAL RECEIVER WITH HIGH SPEED OVERSAMPLING

(75) Inventor: Ronald M. Hickling, Newbury Park, CA (US)

(73) Assignee: Softwaveradio, Inc., Newbury Park, CA (US)

( * ) Notice: Subject to any disclaimer, the term of this patent is extended or adjusted under 35 U.S.C. 154(b) by 208 days.

(21) Appl. No.: 13/444,799

(22) Filed: Apr. 11, 2012

(65) Prior Publication Data
US 2013/0101074 A1 Apr. 25, 2013

Related U.S. Application Data

(60) Provisional application No. 61/474,148, filed on Apr. 11, 2011.

(51) Int. Cl.
  *H03D 1/04* (2006.01)
  *H04L 7/00* (2006.01)
  *H04B 1/10* (2006.01)
(52) U.S. Cl.
  CPC ........................................ *H04B 1/10* (2013.01)
  USPC ........................................... 375/346; 375/354

(58) Field of Classification Search
  CPC .......... H04B 1/30; H04B 1/10; H03H 19/004; H03M 3/30
  USPC ......... 375/316, 346, 256, 242, 244, 245, 247, 375/254; 341/126, 122, 143, 144, 200; 455/130, 313, 323, 324
  See application file for complete search history.

(56) References Cited

U.S. PATENT DOCUMENTS

| | | | | |
|---|---|---|---|---|
| 4,639,619 | A | * | 1/1987 | Baldwin et al. ................. 327/91 |
| 5,557,642 | A | * | 9/1996 | Williams ...................... 375/316 |
| 6,259,281 | B1 | * | 7/2001 | Neff ............................. 327/91 |
| 6,748,025 | B1 | | 6/2004 | Hickling |

* cited by examiner

*Primary Examiner* — Vineeta Panwalkar
(74) *Attorney, Agent, or Firm* — Koppel, Patrick, Heybl & Philpott (57) ABSTRACT

The invention described herein is directed to different embodiments of a wireless communications device that can be used in many different applications, such as but not limited to a digital oversampling receiver adapted to select desired signals and to reject undesired signals. In one embodiment, a wireless communications device is disclosed that comprises an architecture for a receiver front end that obviates the need for high order passive circuitry or RC active circuitry to select desired signals and to reject undesired signals.

4 Claims, 8 Drawing Sheets

PROGRAMMABLE, FREQUENCY AGILE DIRECT CONVERSION DIGITAL RECEIVER WITH HIGH SPEED OVERSAMPLING

RELATED APPLICATIONS

This application claims the benefit of priority of provisional application Ser. No. 61/474,148 filed on Apr. 11, 2011.

BACKGROUND OF THE INVENTION

1. Field of the Invention

This invention relates generally to wireless communication systems, more specifically, to signal reception in a wireless communication system.

2. Description of the Related Art

Wireless systems are becoming a fundamental mode of communication in modern society. In order for wireless systems to continue to penetrate into the telecommunications market, the cost of providing the service must continue to decrease and the convenience of using the service should continue to increase. Several industry standard communication techniques have been developed based upon digital modulation schemes. For example, code division multiple access (CDMA), time division multiple access (TDMA) and frequency hopping techniques have been used to develop modern communication systems. As these systems are implemented in parallel with one another, it is often advantageous to have a receiver that is capable of communication using more than one of these standardized techniques. In order to do so, it is necessary to have a receiver that is capable of receiving signals which have been modulated according to several different modulation techniques.

Conventional receivers are implemented using double conversion receiver architectures. A double conversion receiver architecture is characterized in that the received radio frequency (RF) signal is converted to an intermediate frequency (IF) signal and the IF signal is subsequently converted to a baseband signal. In addition, gain control can also be applied at the IF. However, double conversion receivers have the disadvantage of utilizing a great number of circuit components, thereby, increasing the cost, size and power consumption of the receiver. An example of such a receiver is a superheterodyne receiver which uses frequency mixing or heterodyning to convert a received signal to a fixed IF signal, which can be more conveniently processed than the original radio carrier frequency.

Figure 1:
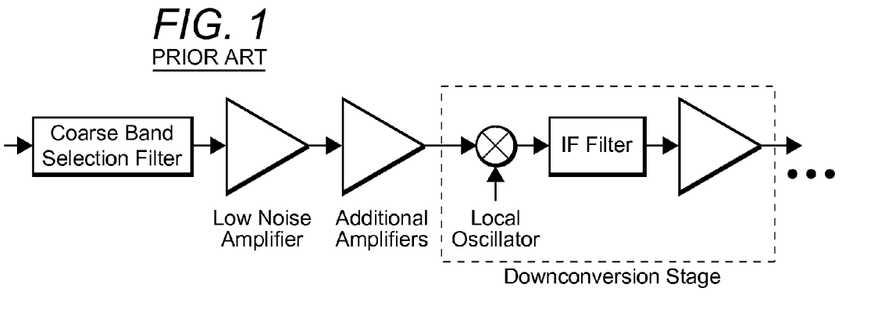
FIG. 1 is a block diagram of a prior art receiver.

Conventional analog receivers have traditionally used some variation of the superheterodyne approach generally consisting of an input coarse band selection filter, an amplifier stage, and one or more downconversion stages. The objective of the downconversion stage(s) is to translate the signal of interest into one or more intermediate frequencies, where the task of selecting the signal of interest (and rejecting other signals/noise) can be managed most efficiently given the limitations of passive filter technology. FIG. 1 discloses a representative block diagram of a typical superheterdyne receiver. Additional downconversion stages are often used to improve performance.

Figure 2:
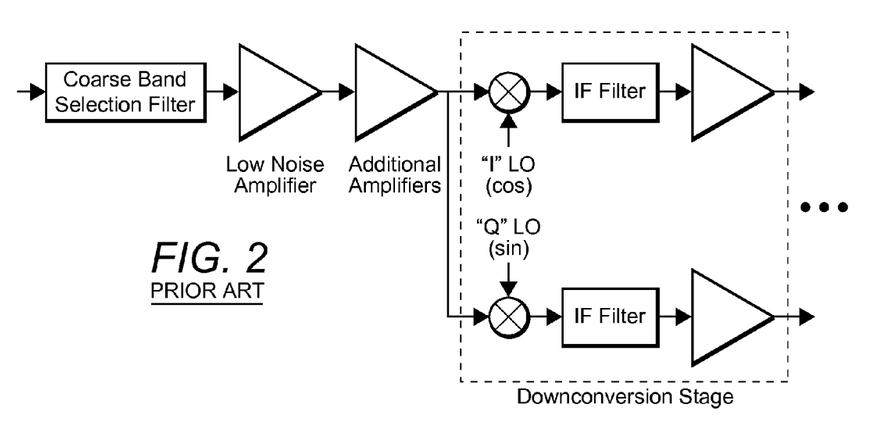
FIG. 2 is a block diagram of a prior art receiver.

It is useful to perform downconversion using "in-phase" and "quadrature" versions of a local oscillator. Doing this has many advantages including avoiding an inherent drawback of superheterodyne architectures, namely that they tend (without input filtering) to work at two different input frequencies. I-Q reception tends to cancel out one of these images. A typical block diagram of a superheterodyne using the I-Q approach is shown in FIG. 2.

While superheterodyne receivers have achieved some limited level of sophistication with the advent of high speed analog-to-digital converter (ADC) technology, thus allowing the digital processing of the final IF output(s), the basic anatomy of the superheterodyne receiver has remained unchanged. Consequently the performance parameters of the receiver, specifically the ability to be tuned across a wide range of frequencies and the dynamic range, are limited by the behavior of the front end analog circuits.

Figure 3A:
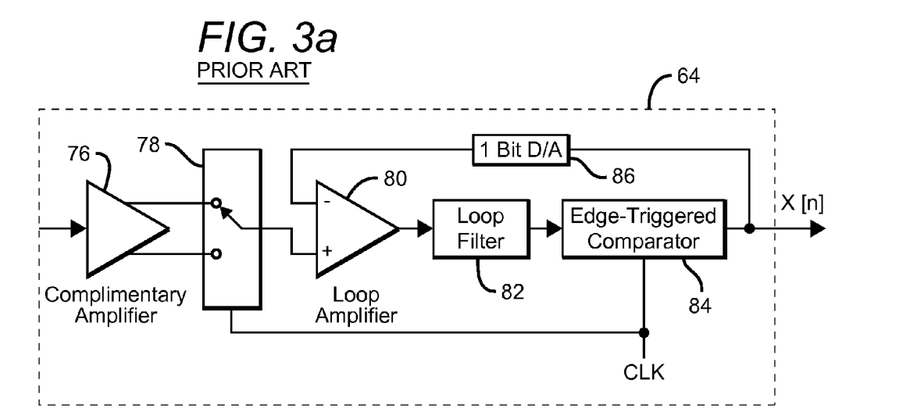
FIG. 3a is a block diagram of a prior art Analog-to-Digital front end.
Figure 3B:
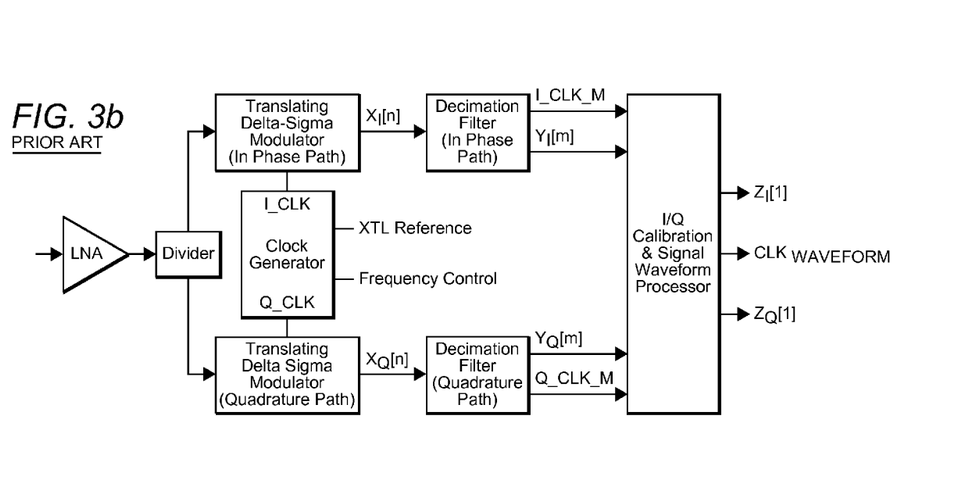
FIG. 3b is a block diagram of a prior art receiver.

An improvement to the conventional superheterodyne receiver is disclosed in "Direct Conversion Delta-Sigma Digital Receiver" (U.S. Pat. No. 6,748,025 to Hickling). In this architecture, frequency downconversion is integrated into the switching tree of a specialized delta-sigma converter, resulting in the ability to simultaneously downconvert an RF signal and quantize the resulting signal. A block diagram of the scheme for the "Direct Conversion Delta-Sigma Digital Receiver" is shown in FIGS. 3a-3b. FIG. 3a shows the configuration of a basic ADC front end, while FIG. 3b shows two front end circuits used together in an I-Q arrangement.

The "Direct Conversion Delta-Sigma Digital Receiver" represents a significant breakthrough in that it permits realization of a widely continuously tunable receiver front end, limited only by the available tuning range of the input clock signal. The circuit has been shown to have an input signal operating range between less than 100 MHz and greater than 6 GHz, with a dynamic range of slightly less than 60 dB.

The limitations of conventional superheterodyne receivers are generally understood in the art and include the need for a high resolution local oscillator (LO) due to the fact that the intermediate frequency must be placed precisely in the middle of the passband of a piezoelectric passive filter (crystal or SAW). Producing a synthesizer that is both widely tunable and simultaneously having low phase noise poses a fundamental challenge since the it necessitates that the loop have a large feedback divider ratio (and is consequently very "loose"—i.e., the rate at which it updates its phase error information and corrects the frequency of the voltage controlled oscillator (VCO) is very slow). Another limitation is the reliance on passive filter technology. Consequently, the user must make the choice to use a design that includes a very steep, fixed frequency filter, such as a typical IF filter, or must deal with "low Q" transfer functions in tunable filters. Unlike digital filter technology, the designer must choose between tunability and selectivity. Also, the front end designs of conventional superheterodyne receivers that are widely tunable are by necessity unwieldy because they require dividing the frequency range into bands and to use a completely different filter network for each band.

SUMMARY

The invention provides various embodiments of a wireless receiver, systems and methods of receiving a wireless signal. The invention is configured to be efficient, reliable, cost effective and can be arranged to provide a wireless receiver adapted to select desired signals and to reject undesired signals. The different embodiments comprise elements to implement a communication device capable of operating over a very wide range of frequencies using a highly integrated circuit. The elements can comprise many different devices arranged in different ways, with some devices comprising a plurality of digital filters and/or amplifiers.

In one embodiment, as broadly described herein, a wireless communications device is disclosed that comprises an architecture for a receiver front end that obviates the need for high order passive circuitry or RC active circuitry to select desired signals and to reject undesired signals. As a result of selectivity not being dependent on the fundamental physics of passive devices, much greater selectivity can be achieved without requiring external device technologies, such as Surface Acoustic Wave (SAW) filters, and multiple stages of frequency translation, which achieve selectivity at the expense of dynamic range due to the distortion incurred through multiple stages of analog processing. The architecture can further comprise a multipath architecture adapted to detect the phase and amplitude of a receive signal and further configured to utilize independently programmable waveforms for frequency translation and quantization.

These and other aspects and advantages of the invention will become apparent from the following detailed description and the accompanying drawings which illustrate by way of example the features of the invention.

DETAILED DESCRIPTION

The invention described herein is directed to different embodiments of a wireless communications device that can be used in many different applications, such as but not limited to a digital oversampling receiver adapted to select desired signals and to reject undesired signals.

Figure 4:
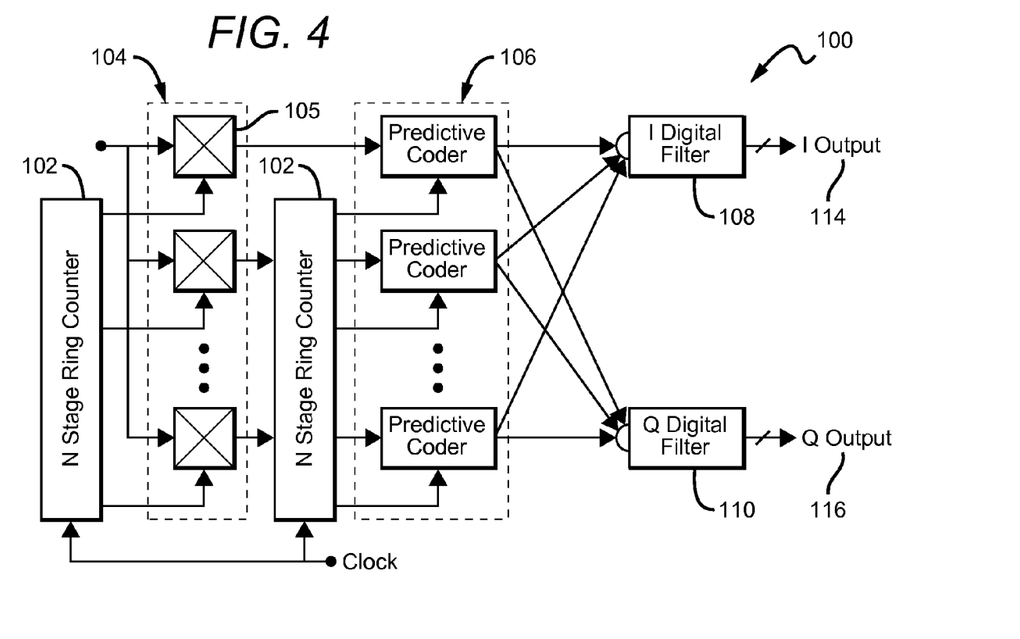
FIG. 4 is a block diagram of a wireless communications device according to an embodiment of the invention.

FIG. 4 is a block diagram showing a digital receiver 100 according to an embodiment of the invention. The architecture of the digital receiver 100 in FIG. 4 is capable of operating in several different modes. The digital receiver 100 of FIG. 4 comprises an N stage ring counter 102, N path switching network 104, predictive coders 106, an in-phase (I) digital filter 108 and a quadrature (Q) digital filter 110, wherein an RF input signal 112 is received by the receiver 100 such that the receiver 100 is adapted to process the RF input signal 112 and produce an I output signal 114 and a Q output signal 116.

Figure 5:
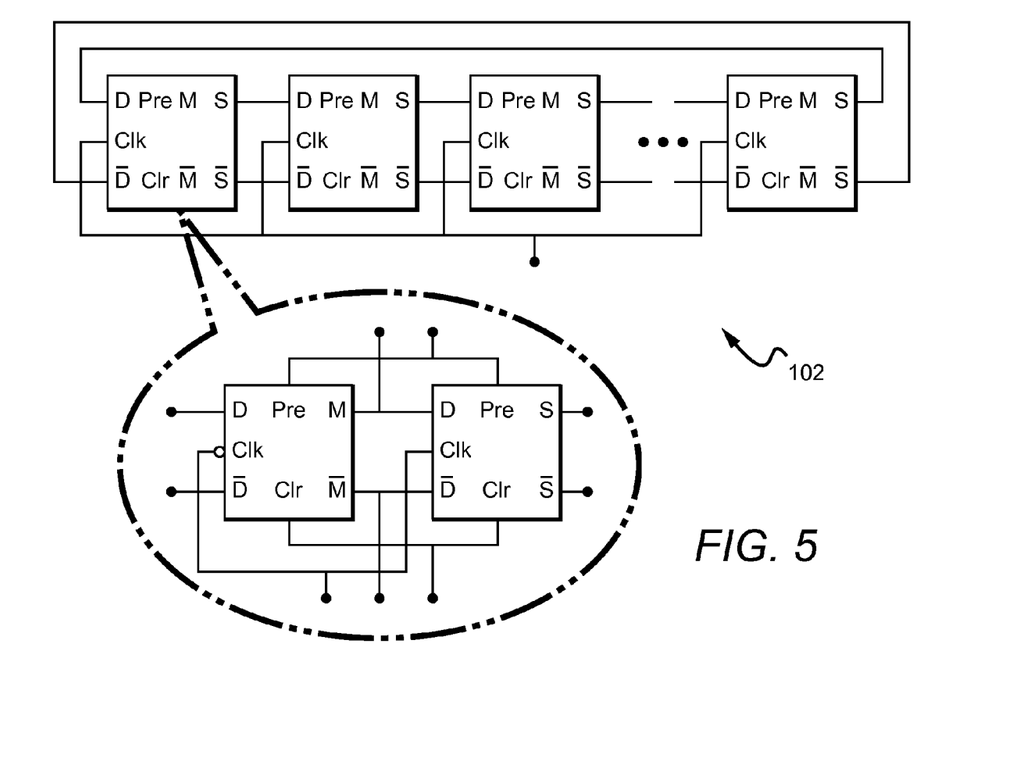
FIG. 5 is a block diagram of an N stage ring counter according to an embodiment of the invention.

The N stage ring counter 102 is configured to generate timing clock signals for the N path switching network 104 and the predictive coders 106. FIG. 5 discloses a block diagram of an embodiment of an N stage ring counter 102. The N stage ring counter 102 is designed using the maximum number of programmable stages for the counter, and a multiplexer is used to select which tap of the counter is fed back into the input. In an embodiment of the N stage ring counter 102, the outputs of both the master and slave stages of the master-slave flip-flops are used in order to permit half-clock cycle delays. The connections to the Preset (Pre) and Clear (Clr) inputs are not shown in FIG. 5, but are used to program the waveform to be conveyed by the counter 102. The programmability of the number of stages is implemented using a multiplexer (MUX) which directs which stage is selected to drive the first stage of the counter 102. In operation, the counter 102 would first be loaded asynchronously with the count pattern using the Preset and Clear inputs and then the counter 102 would be clocked, producing an N-cycle digital waveform. It should be noted, however, that since both master and slave outputs are monitored, an N-stage counter would have 2×N outputs, thus doubling the number of available phase outputs. Furthermore, this makes an N-cycle waveform capable of being realized using only N/2 stages, provided that the counter waveforms be restricted to those wherein logic state transitions only one per flip-flop clock cycle. This latter restriction effectively places the restriction that the output waveform having 1s and 0s sequentially occurring in pairs.

Figure 6A:
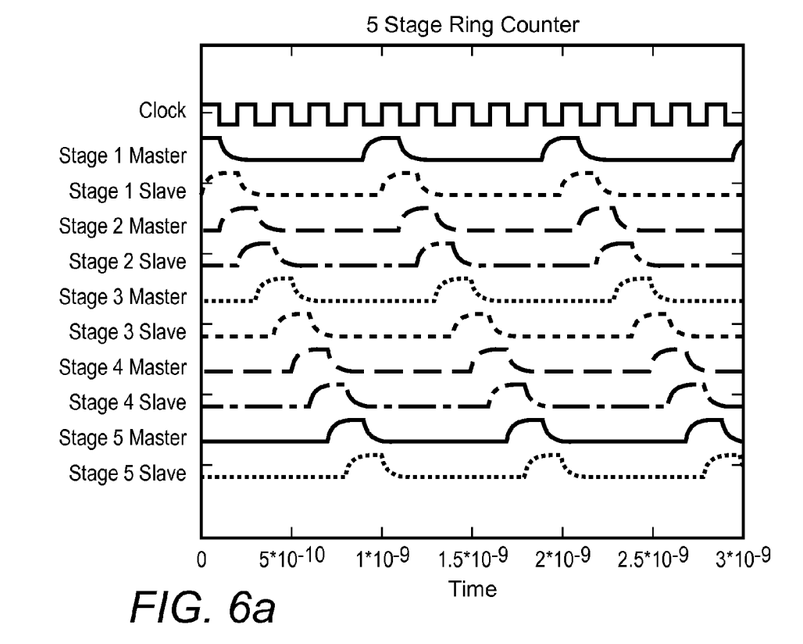
FIG. 6a is a waveform of an N stage ring counter according to an embodiment of the invention.
Figure 6B:
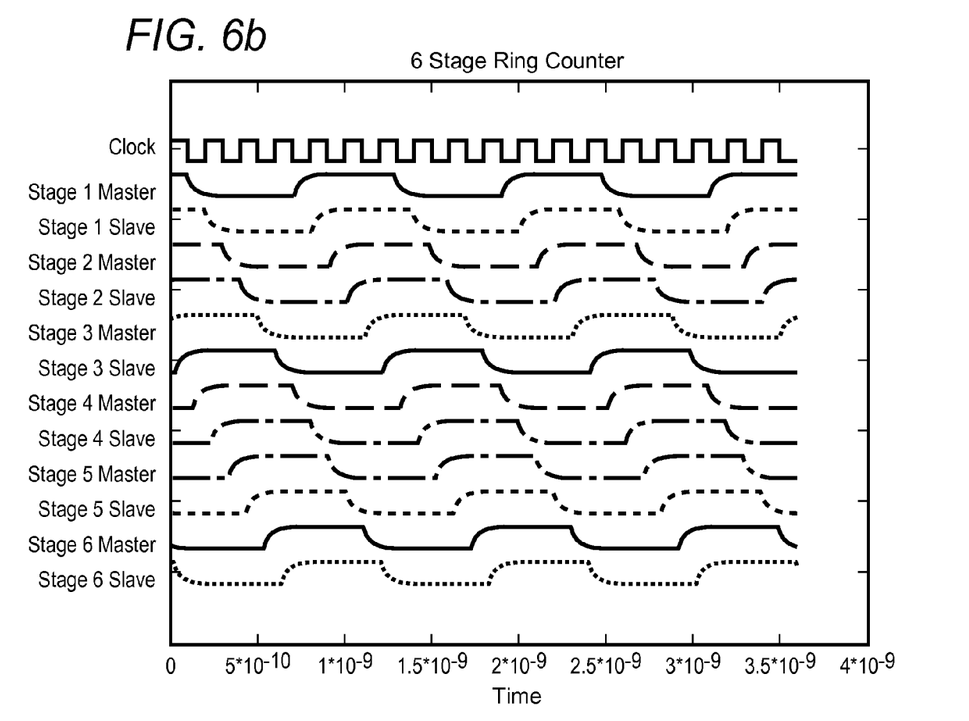
FIG. 6b is a waveform of an N stage ring counter according to an embodiment of the invention.

FIG. 6a discloses an example of a representative waveform of a five stage ring counter having a "10000" count sequence, while FIG. 6b discloses a six stage ring counter having a "111000" count sequence. Other embodiments having higher numbers of bits, two or more ring counters can be clocked in parallel to create multibit outputs to drive multibit N path switching networks 104.

The N path switching network 104 is configured to have the same number of stages as the first N stage ring counter 102 that drives the network. In an embodiment of the one bit configuration, the switching network 104 can be comprised of N current steering MUXes that take the input differential signal and either inverts its polarity or passes it unchanged (mathematically this amounts to multiplying the signal by ±1). In other embodiments, such as a "1.5 bit" configuration, two current steering MUXes are used to collectively permit the passing of the signal, inverting the signal, or suppressing the signal (multiplying by ±1 or 0). In other embodiments, the complexity of the switching network 104 can be extended to any number of bits through thermometric coding.

Figure 7A:
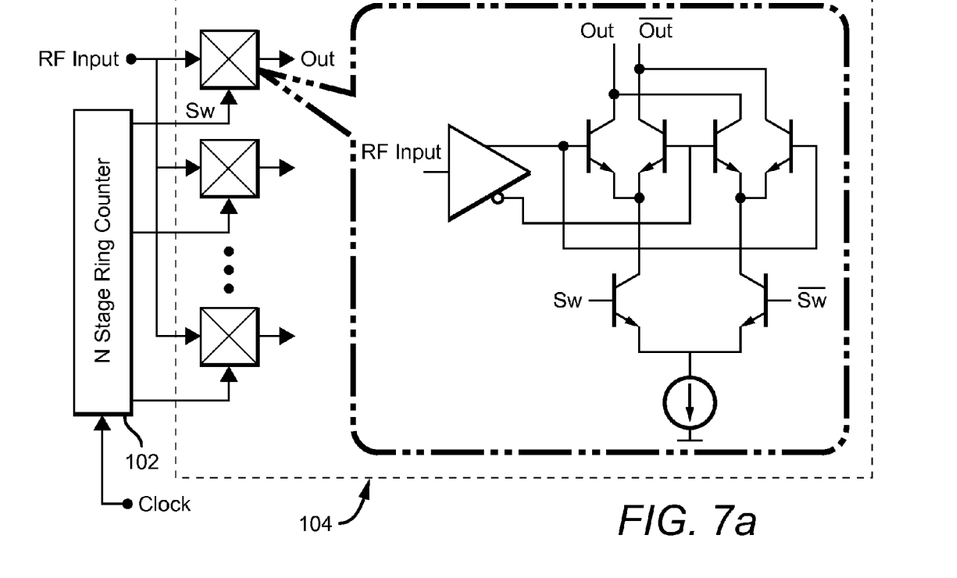
FIG. 7a is a block diagram of an N path switching network according to an embodiment of the invention.
Figure 7B:
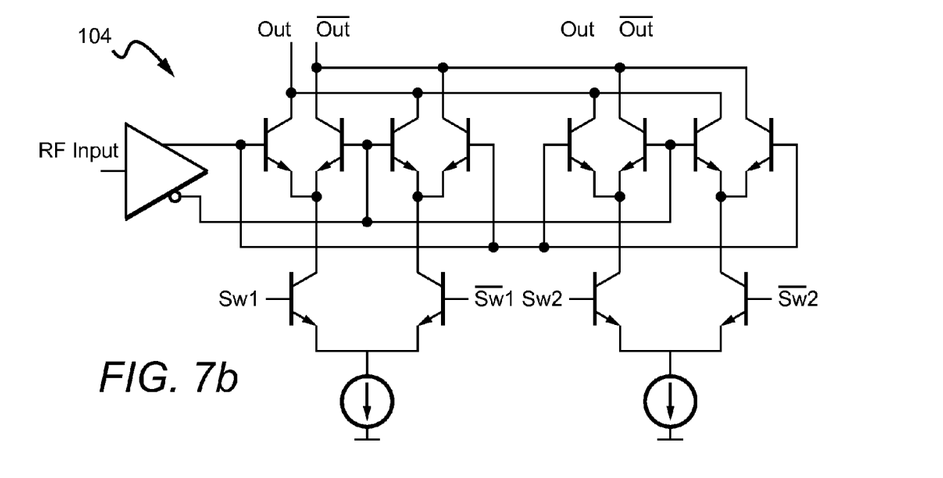
FIG. 7b is a block diagram of an N path switching network according to an embodiment of the invention.

An example of a schematic diagram of one path for the N path switching network 104 is shown in FIG. 7a, while FIG. 7b discloses a schematic diagram of a 1.5 bit version of the switching network 104. In the embodiment of FIG. 7a, each of the "Sw" inputs is driven by one output of the N stage ring counter 102. For the 1.5 bit system, switching signals are generated by simultaneously programming two separate ring counters 102 operating in synchrony. This approach to switching can be extended to M bits through the use of $2^M-1$ switches operating in parallel and a corresponding increase in the complexity of the ring counter, for example $2^M-1$ ring counters operating in parallel.

Figure 8:
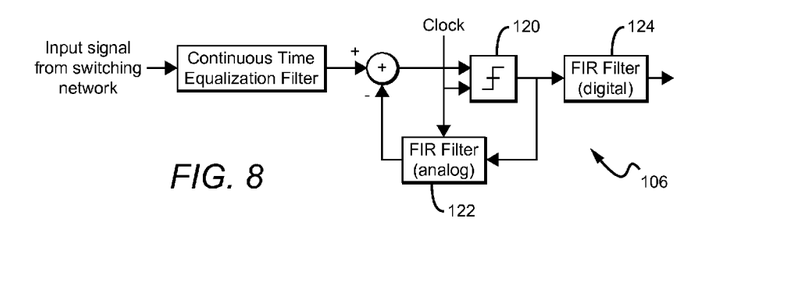
FIG. 8 is a block diagram of a predictive coder according to an embodiment of the invention.

Referring back to FIG. 4, the output of each of the switches 105 in the switching network 104 is arranged to be the input for a respective predictive coder 106, which serves as the front end of an oversampling analog-to-digital (A/D) converter. The output of the predictive coder 106 is then fed into a digital filter, which both suppresses the quantization noise and simultaneously converts the high speed serial data stream into a lower speed parallel data stream. A block diagram of the predictive coder 106 with the post filtering is shown in FIG. 8. In the embodiment of the predictive coder 106 of FIG. 8, the predictive coder 106 comprises a feedback loop including a quantizer 120 and a feedback analog finite impulse response (FIR) filter 122 which is configured to produce a high speed serial stream which contains the signal of interest along with quantization noise. A digital FIR filter 124 is configured to suppress the quantization noise and convert the high speed serial data stream into a lower speed parallel data stream.

At least one advantage of the invention is that the oversampling converter avoids the use of continuous time circuitry, which severely limits the maximum achievable effective number of bits (ENOB) because of the sensitivity to jitter. Furthermore, the invention exploits the inherent speed of differential current steering design technology and is therefore capable of operating at clock speeds in excess of 11 GHz. Yet another advantage of the invention is that the predictive coders 106 can be clocked using the same clock as the switching network 104, a multiple of the clocks, or a submultiple of the clocks used in the switching network discussed above. This programmable ratio is achieved by placing a repeating pattern in the ring counter to be operated at the multiple of the slower frequency.

Figure 9A:
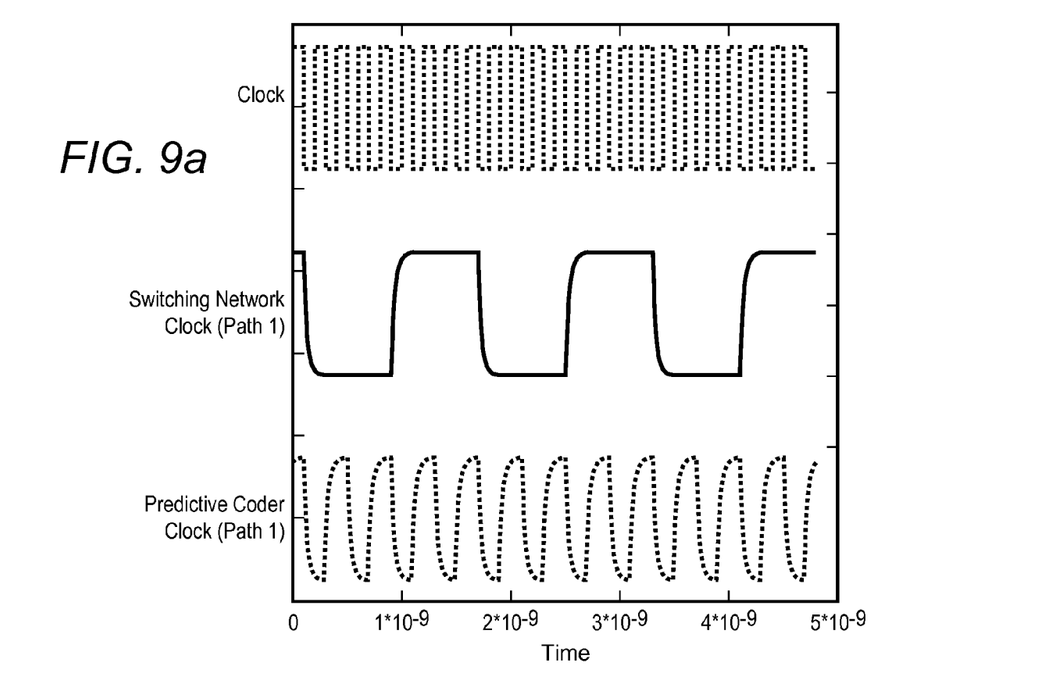
FIG. 9a is a waveform of a predictive coder in operation according to an embodiment of the invention.
Figure 9B:
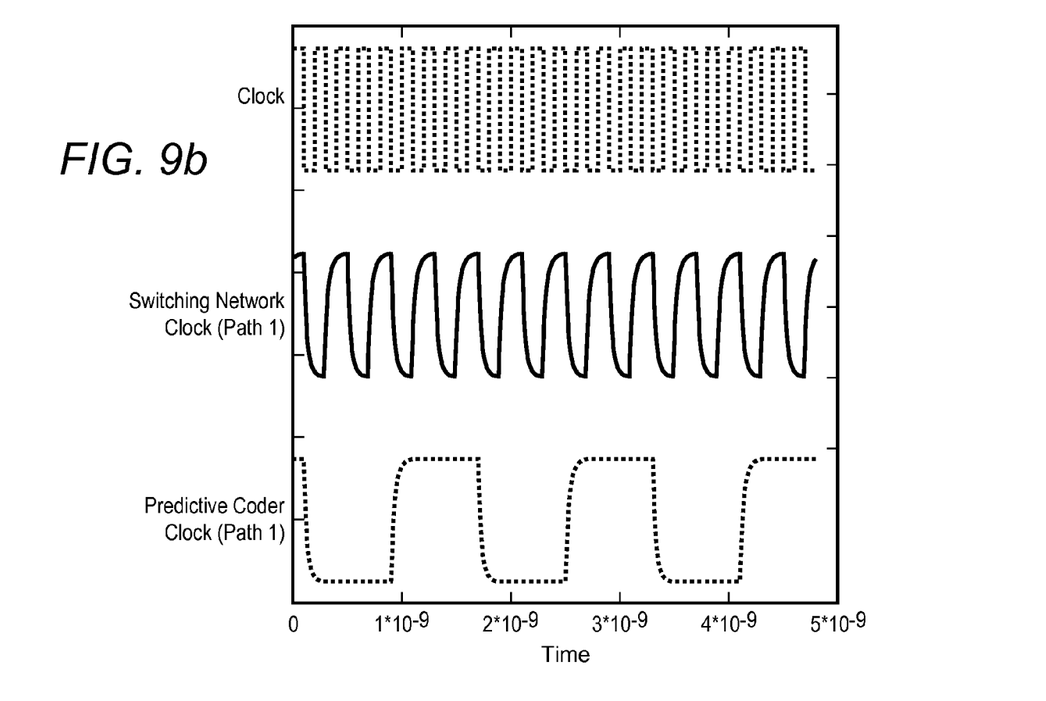
FIG. 9b is a waveform of a predictive coder in operation according to an embodiment of the invention.

FIGS. 9a and 9b are examples of timing diagrams of an embodiment of the predictive coder 106 while in operation, wherein the number of stages of the ring counters 102 is set to eight. In FIG. 9a, a "11110000" pattern is programmed into the switching path (an LO frequency of 5 GHz÷8=625 MHz). The predictive coder 106 is clocked using a "10101010" pattern (a clock frequency of 2.5 GHz). Note that in this configuration there are 16 separate phases (through the use of "master" and "slave" outputs from each of the flip-flops). In FIG. 9b, this situation is reversed and the LO is 2.5 GHz and the predictive coder clock is 625 MHz. Thus the receiver can be programmed to accommodate relatively narrowband, high carrier frequency signals or relatively wideband, low carrier frequency signals through the appropriate programming of the ring counters. The number of stages and/or the pattern programmed into the switching path 104 and the predictive coder 106, as discussed above, are non-limiting examples and are not intended to limit the scope of the invention. In other embodiments, the ring counters 102 can have more or less than eight stages, while the pattern programmed into either the switching path 104 or the predictive coder 106 can be the same or different.

Figure 10A:
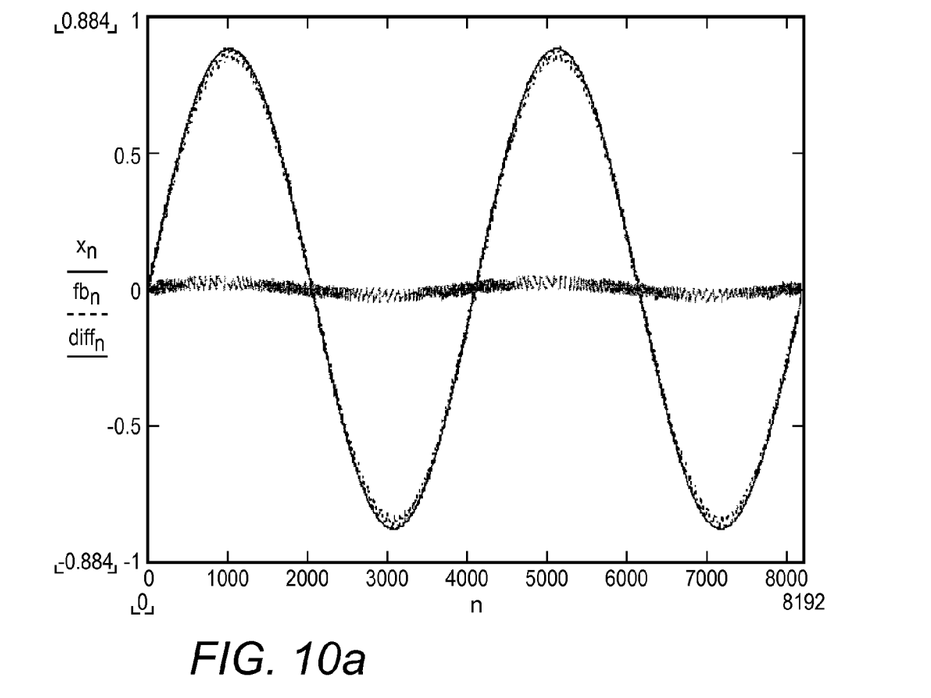
FIG. 10a is a waveform of a predictive coder in operation according to an embodiment of the invention.
Figure 10B:
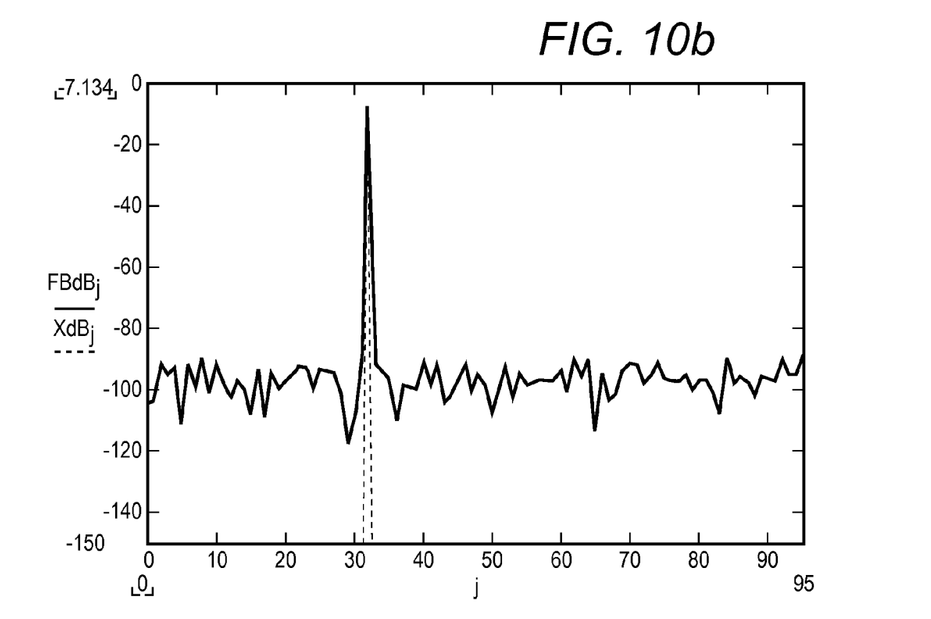
FIG. 10b is a waveform of a predictive coder in operation according to an embodiment of the invention.

FIGS. 10a-10b disclose a numerical simulation of an embodiment of the predictive coder 106 while in operation. The clock frequency is normalized to 1 Hz and the resolution of the quantizer is one bit. In similar fashion to other feedback oversampling A/D converter engines, such as the delta-sigma converter, the overall resolution is given by the resolution of the quantizer 120 along with the frequency of the clock signal that is being fed into the predictive coder 106. If either the resolution of the quantizer 120 or the ratio of the clock frequency to the bandwidth of the input signal is increased, the resolution of the converter improves. FIG. 10a shows the time domain waveforms, with the original sine wave as a solid line, the predictive coder output (with incomplete filtering) is dotted, and the dashed waveform representing the transient error. FIG. 10b shows the Fast Fourier Transform (FFT) of the output, wherein the spectrum of an ideal sine wave is shown as a dotted line while the coder output is shown as a solid line.

In an embodiment of the invention, the N stage ring counter 102 that drives the N path switching network 104 is/are programmed with a simple 50% duty cycle waveform. However, in other embodiments, the N stage ring counter 102 and the N path switching network 104 can have a duty cycle waveform higher or lower than 50%, and is not intended to be limited to a simple 50% duty cycle waveform. In this embodiment, the N paths of the switching network 104 produce 2×N (because both "master" and "slave" outputs are used) time shifted (therefore phase shifted) versions of the LO waveform. Although the waveforms are square waves, because the effective LO frequency is so close to the incoming carrier frequency the frequency of the third and higher odd harmonics of the square wave are greatly separated from the fundamental. Thus the effect of these harmonics can be ignored and the system can be analyzed as if the LO signals are sine waves. By the very nature of the ring counter 102, the phases of these signals occur in 360°/2×N phase increments. For example, an eight stage counter 102 with a "11110000" waveform would produce sixteen outputs separated in phase increments of 22.5°. These multiple outputs can be trigonometrically combined to produce conventional I-Q outputs as will be described herein.

Figure 11:
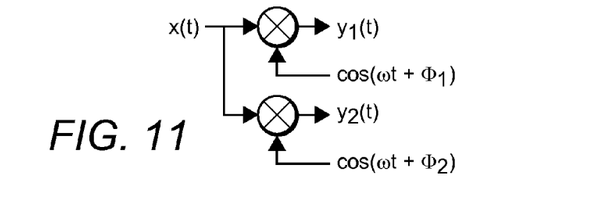
FIG. 11 is a block diagram of a wireless communications device according to an embodiment of the invention.

The underlying theory of operation for the receiver 100 is that the amplitude and phase information of any incoming waveform can be uniquely extracted from the incoming waveform using two sine waves with any arbitrary phase difference between them. Although the usual case prescribes that the two signals be in perfect phase quadrature (i.e., 90° out of phase with each other), any two arbitrary phases can be used as long as they are not in perfect phase alignment or 180° out of phase with one another. FIG. 11 discloses a block diagram of such a system, which we will now proceed to analyze.

Since amplitude and phase information can be extracted using any two arbitrary phases, it then necessarily follows that it should be possible to use trigonometric identities to generate the waveforms that would result from the use of waveforms in true quadrature. Let us assume, for example, then that the incoming waveform is one that has been modulated using conventional quadrature modulation, that is:

$$x(t)=I(t)\cos \omega t+Q(t)\sin \omega t$$

If we mix this signal (or equivalently multiply it) with a signal, for example, $\cos(\omega t+\phi_1)$, the mathematical expression for the resulting waveform is as follows:

$$\begin{aligned}y_1(t) &= x(t)[\cos(\omega t + \phi_1)] \\ &= x(t)[\cos\omega t \cos\phi_1 - \sin\omega t \sin\phi_1] \\ &= [I(t)\cos\omega t + Q(t)\sin\omega t] \\ &\quad [\cos\omega t \cos\phi_1 - \sin\omega t \sin\phi_1] \\ &= I(t)\cos\phi_1 \cos^2\omega t + Q(t)\cos\phi_1 \sin\omega t \cos\omega t - \\ &\quad I(t)\sin\phi_1 \sin\omega t \cos\omega t - Q(t)\sin\phi_1 \sin^2\omega t \\ &= \frac{I(t)}{2}\cos\phi_1(1+\cos2\omega t) + \frac{Q(t)}{2}\cos\phi_1 \sin2\omega t - \\ &\quad \frac{I(t)}{2}\sin\phi_1 \sin2\omega t - \frac{Q(t)}{2}\sin\phi_1(1-\cos2\omega t)\end{aligned}$$

Note that the above waveform contains both baseband (or "DC") components as well as components that are spectrally centered about twice the carrier frequency. Since the phase and amplitude information is contained in the baseband components, we can discard the higher frequency components by lowpass filtering to reject the components centered about twice the carrier frequency:

$$y_1^{BB}(t) = \frac{I(t)}{2}\cos\phi_1 - \frac{Q(t)}{2}\sin\phi_1$$

The superscript "BB" represents the baseband component (or amplitude and phase information) for the signal under consideration. It also follows that if a second signal (with a phase $\phi_2$) is additionally mixed with the incoming signal, the resulting baseband waveform would be:

$$y_2^{BB}(t) = \frac{I(t)}{2}\cos\phi_2 - \frac{Q(t)}{2}\sin\phi_2$$

These two equations can be arranged in matrix form and used to solve for I(t) and Q(t) in terms of the baseband waveforms $y_1^{BB}(t)$ and $y_2^{BB}(t)$.

$$\begin{bmatrix} \frac{\cos\phi_1}{2} & -\frac{\sin\phi_1}{2} \\ \frac{\cos\phi_2}{2} & -\frac{\sin\phi_2}{2} \end{bmatrix} \begin{bmatrix} I(t) \\ Q(t) \end{bmatrix} = \begin{bmatrix} y_1^{BB}(t) \\ Y_2^{BB}(t) \end{bmatrix}$$

Solving for I(t), Q(t)

$$I(t) = \frac{-2\sin\phi_2 y_1^{BB}(t) + 2\sin\phi_1 y_2^{BB}(t)}{-\sin\phi_2\cos\phi_1 + \sin\phi_1\cos\phi_2} = \frac{2\sin\phi_2 y_1^{BB}(t) - 2\sin\phi_1 y_2^{BB}(t)}{\sin(\phi_2 - \phi_1)}$$

$$Q(t) = \frac{2\cos\phi_1 y_2^{BB}(t) - 2\cos\phi_2 y_1^{BB}(t)}{-\sin\phi_2\cos\phi_1 + \sin\phi_1\cos\phi_2} = \frac{2\cos\phi_2 y_1^{BB}(t) - 2\cos\phi_1 y_2^{BB}(t)}{\sin(\phi_2 - \phi_1)}$$

Since this embodiment of the N path system generates projections from N different phases of the LO it would follow that N−2 of these phases are redundant to generate the amplitude and phase information from the incoming signal of interest. Yet these redundant signals can be advantageously used to improve the detection of the amplitude and phase of the incoming signal, resulting in a signal processing gain and commensurate improvement in signal-to-noise ratio (SNR). However, the challenge in using these N outputs is to accomplish the following:

1. Choose pairs of outputs from which "estimates" of I(t) and Q(t) can be computed. These estimates are then added together (effectively averaging them together times a scaling factor).

2. Since there is no "canonical" way of choosing such pairs we must establish some reasonable criteria in choosing such pairs, wherein one example of the criteria is as follows:

a) Every phase will appear in the same number of pairs as every other phase. This keeps the estimates of I(t) and Q(t) from "favoring" one or more particular phases.

b) Each of the pairs must be chosen in such a way as to ensure that ($\phi_2-\phi_1$) will never be 0° or 180°.

c) To the extent possible, it is important to ensure that the angle between the two phases ($\phi_2$ and $\phi_1$) is large enough so that the values of coefficients are not excessively large or small.

Figure 12:
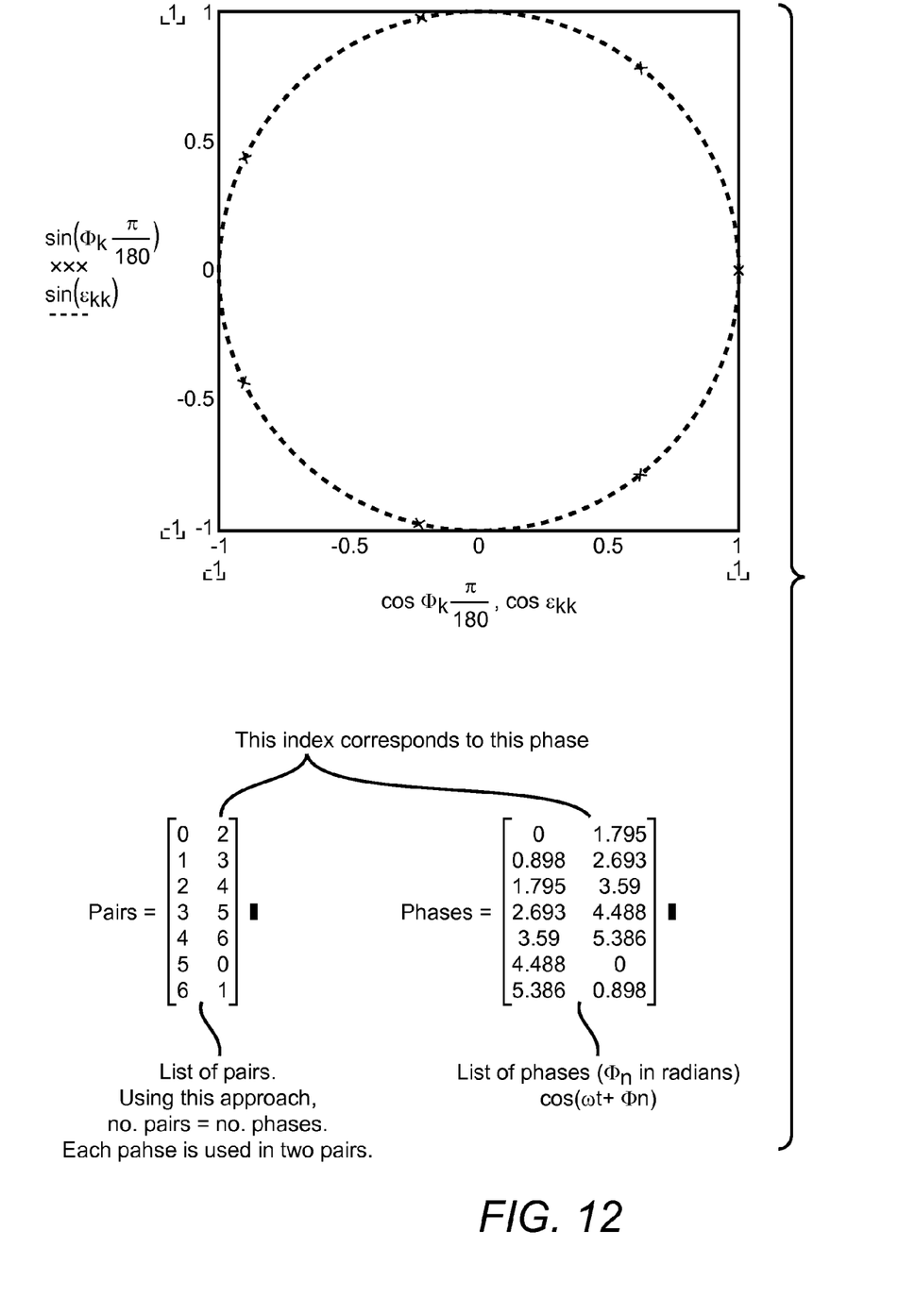
FIG. 12 is an example of a phase pairing scheme according to an embodiment of the invention.

At least one methodology for choosing these pairs that satisfies these criteria is to pair off every other phase (i.e., 0 and 2, 1 and 3, 2 and 4, 3 and 5, etc.) so that N pairs are formed. This methodology satisfies all three criteria above provided that N is not excessively large. For example if N=128, then the angle between pairs would be 5.625°, which has a sine of 0.098. An example of how this pairing scheme is implemented, wherein Phase k is paired with Phase k+2 and N=7 is shown in FIG. 12.

Once the pairs are chosen, the equations for I(t) and Q(t) in terms of $y_1^{BB}(t)$ and $y_2^{BB}(t)$ are used to compute the necessary coefficients to multiply $y_1^{BB}(t)$ and $y_2^{BB}(t)$. For an N path architecture, there are N pairs of phases, which each produce an estimate of I(t) and Q(t). When these N estimates of I(t) and Q(t) are added together, the net effect is that the N estimates are averaged, with a scaling factor, resulting in a processing gain as stated earlier. The results of a Monte Carlo simulation showing the effect processing gain is shown in Table 1.

TABLE 1

| N | Gain Err. [dB] | Phase Err. [°] |
|---|---|---|
| 8 | 0.512 | 2.561 |
| 12 | 0.447 | 2.034 |
| 16 | 0.368 | 2.009 |
| 24 | 0.339 | 1.555 |
| 32 | 0.326 | 1.6 |
| 64 | 0.189 | 1.044 |

Each path was simulated with a uniformly distributed random gain error of ±1 dB and phase error of ±10°. As the number of paths (N) increases, the overall gain and phase error of the recovered I and Q information improves, showing the effect of this processing gain.

The architecture of the invention is ideal for implementation as a highly integrated circuit. Digital filters are not prone to the lot-to-lot variations of passive devices, obviating the need for complex architectures to compensate for these variations in inductor and capacitor values. Since conversion to digital is done in functionally the first stage of the receiver, the receiver is less prone to distortion and therefore is capable of much greater dynamic range performance than a conventional analog architecture.

The invention disclosed herein is an improvement over conventional receivers, in particular, the multipath architecture permits more accurate detection of the phase and amplitude of a received signal, thereby achieving far better signal to noise ratio (SNR) relative to it. In addition, by using independently programmable waveforms for frequency translation and quantization, the invention provides a user much greater flexibility programming the desired bandwidth and carrier frequency of the receiver independently. In contrast, U.S. Pat. No. 6,748,025 could only achieve a bandwidth that scales with carrier frequency.

Lastly, all of the above makes it possible to implement a communication device capable of operating over a very wide range of frequencies using a highly integrated circuit without the need to reprogram the circuit using external passive components (referred to as frequency agility). While previous architectures have claimed such agility, they have generally required the use of external passive devices and/or have achieved such agility at the expense of receiver performance.

Although the invention has been described in considerable detail with reference to certain configurations thereof, other versions are possible, such that the invention may be embodied in other specific forms without departing from its spirit or essential characteristics.

I claim:

1. A method of receiving a wireless transmission comprising the steps of:
   programming a count pattern into an N stage ring counter, wherein N is an integer of value greater than one;
   producing an N-cycle digital waveform;

combining said N-cycle digital waveform with said wireless transmission;

oversampling said combined digital waveform and said wireless transmission to form a high speed serial stream, said high speed serial stream comprised of a signal of interest and a quantization noise signal;

suppressing said quantization noise signal; and converting said high speed data stream into a lower speed.

2. The method of claim 1, employed in a circuit within a receiver comprising:

a clock, wherein said N stage ring counter coupled to said clock;

an N path switching network;

at least one predictive coder, wherein a respective one of said at least one predictive coder is coupled to a respective switch of said N path switching network; and a digital filter configured to receive an output signal from each of said at least one predictive coder.

3. The method of claim 1, wherein said N stage ring counter is configured to produce a clock signal for an N path switching network and an at least one predictive coder.

4. The the method of claim 3, wherein said N path switching network comprises at least one switch adapted to receive an input signal.

\* \* \* \* \*